UNITED STATES PATENT OFFICE 2,351,936

AZO DERIVATIVES OF SULPHONES AND A METHOD OF MAKING THE SAME

Max Dohrn, Berlin-Charlottenburg, and Otto Laubereau, Berlin-Neukolln, Germany, assignors to Schering Corporation, Bloomfield, N. J., a corporation of New Jersey No Drawing. Application November 26, 1940, Serial No. 367,224. In Germany November 20, 1939

17 Claims. (Cl. 260—175)

This invention relates to derivatives of sulphones and more particularly to therapeutically valuable sulphones and a method of making the same.

In Letters Patent No. 2,328,548 there have been described urea derivatives of sulphones of the general formulas

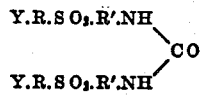

and

respectively, wherein:

R and R' are the same or different aromatic residues,

X is a urea residue, and

Y an amino group or a group convertible thereinto.

These urea derivatives are, compared with the hitherto known sulphones of a good bactericidal efficiency, while possessing a low toxicity; they cannot, however, be used therapeutically for injection purposes, owing to their insolubility, or low solubility, in water.

We have now found, that this drawback may be avoided by the use of specific urea derivatives of the above indicated formulas, namely of those, in which the group Y, which is a group convertible into an amino group, represents an azo group with an aromatic, specifically an aryl, residue, containing one or several groups capable of forming water-soluble salts. These derivatives are obtained by diazotizing in the usual manner compounds described in the above mentioned application, in which Y indicates an amino group, and coupling the diazo compounds obtained with aromatic compounds capable of coupling, especially with compounds of the naphthalene series, as, for instance, naphthoic acids, naphthol sulphonic acids, and naphthyl amino sulphonic acids, substituted with one, preferably with several groups capable of forming water-soluble salts, for instance with carboxyl, sulpho, amino, and the like groups.

Apart from this way of producing compounds according to the present application by means of coupling, they may also be obtained according to other methods known per se, as they are, for instance, described in the German Letters Patent 607,537, 610,320 and 638,701, for instance, by condensing the starting materials with nitroso compounds of the above mentioned compounds capable of coupling, by reduction of suitable azoxy compounds, or by dehydrogenisation of the corresponding hydrazo compounds.

The following examples serve to illustrate the invention, without, however, limiting the same to them.

Example 1

2 grs. of 4-ureido-4'-amino diphenylsulphone are suspended in 20 ccs. of absolute alcohol, and, after adding the calculated amount of concentrated hydrochloric acid, diazotized with the calculated amount of amyl nitrite. To the diazonium chloride solution obtained a concentrated solution of 2.7 grs. of the sodium salt of 1-naphthol-3,6-disulphonic acid is added at 0° C. and thereafter neutralized by adding sodium carbonate. The precipitate, a red powder, is filtered off by suction and washed with an alcohol-ether-mixture; it represents the disodium salt of the 4-ureido - diphenyl sulphone-4',2''-azo-1'' - naphthol-3'',6''-disulphonic acid, which is purified by recrystallisation from water or dilute alcohol. The salt is soluble in water with neutral reaction.

Example 2

2 grs. of 4-ureido-4'-amino diphenylsulphone are diazotized as described in Example 1, and coupled with 1.55 grs. of the sodium salt of 2-naphthol-1-sulphonic acid. The azo dyestuff obtained, the sodium salt of 4-ureido-diphenyl-sulphone-4',3''-azo-2''-naphthol - 1'' - sulphonic acid, is recrystallized from dilute alcohol and forms brick-red, water-soluble crystals.

Example 3

2 grs. of 4-ureido-4'-amino diphenylsulphone are diazotized as described in Example 1, and coupled with 1.3 grs. of 3-hydroxy-2-naphthoic acid. After filtration by suction and recrystallisation from dilute alcohol, the sodium salt of the 4 - ureido - diphenylsulphone - 4',4'' - azo-3''-hydroxy-2″-naphthoic acid forms bright-red needles, which are soluble in water.

*Example 4*

2 grs. of 4-ureido-4′-amino-diphenylsulphone are diazotized as described above, and coupled with 1.55 grs. of 2-naphthyl amino-8-sulphonic acid. After recrystallisation from alcohol the sodium salt of the azo dyestuff is obtained in the form of brown crystals.

In the same manner as described in the above examples with compounds of the formula Y.R.SO₂.R′.X, there may be produced coupling products with the urea derivatives of the formula

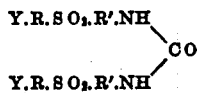

wherein Y is an amino group as they are described in Patent No. 2,328,548. Instead of using naphthalene compounds capable of coupling, as they are employed in the above given examples, one may use other aromatic compounds capable of coupling, provided they contain one or several groups capable of forming water soluble salts. Among them there may be mentioned the following: 1-amino-2-phenol, 2-amino-5-nitrophenol, o- and p-amino benzoic acid, o-chloro-m-aminobenzoic acid, salicylic acid, p-amino salicylic acid, p-amino benzene mono- and disulphonic acid, p-amino benzene sulphonic acid, 1-amino-3-phenolsulphonic acid, 1-amino benzene-3,5-carboxylic acid, 4-chloro-3-amino benzene sulphonic acid, p-phenylen-diamine-4-sulphonic acid, phenylen-diamine-2,6-disulphonic acid, β-resorcylic acid, 2-amino-1-hydroxy-naphthalene, α- and β-naphthylamine, 1-naphthylamine-4-sulphonic acid, 2-naphthylamine-3- and 6-carboxylic acid, 2-naphthylamine-6- and 7- and 8-monosulphonic acid, 1-naphthylamine-4,6- and 4,7- and 4,8-disulphonic acid, 2-naphthylamine-3,6- and 4,8- and 6,8-disulphonic acid, 1-naphthylamine-4,6,8-trisulphonic acid, β-hydroxy naphthoic acid, 2-naphthol-7-sulphonic acid, amino-5-naphthol-7-sulphonic acid, 1,8-dihydroxy-naphthalene-4-sulphonic acid, 2-naphthol-3,6-disulphonic acid, 1,8-dihydroxy-naphthalene-3,6-disulphonic acid, 1,8-naphthylen-diamine-3,6-disulphonic acid, dichloro-benzyl-1-amino-8-naphthol-4,6-disulphonic acid, 2-naphthol-3,6,8-trisulphonic acid and others.

Of course, many changes and variations in the solvents used, reacting conditions, reaction temperature and duration, the isolating and purifying methods employed and so forth may be made by those skilled in the art, provided they are used in accordance with the principles set forth in the annexed specification and in the claims annexed hereto.

What we claim is:

1. Process for the preparation of derivatives of sulphones of the general formula

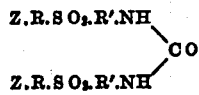

and

wherein:

R and R′ represent phenyl residues,
X a urea residue, and
Z an azo group with a radical of the benzene and naphthalene series, containing at least one group capable of forming water soluble salts, comprising diazotizing sulphones of the general formulas

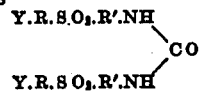

and

respectively, wherein R,R′ and X have the above given meaning, and Y indicates an amino group, and coupling the product with a compound of the benzene and naphthalene series capable of coupling and containing at least one group capable of forming water soluble salts.

2. Process as claimed in claim 1, comprising coupling with a 1-naphthol-3,6-disulphonic acid compound.

3. Process as claimed in claim 1, wherein the aryl coupling component is a compound of the naphthalene series.

4. Derivatives of sulphones of the following formula:

wherein

R and R′ represent phenyl residues,
Z an azo group linked to a radical of the benzene and naphthalene series containing a group capable of forming water-soluble salts, and
Z′ a member of the group consisting of

and hydrogen.

5. Aryl azo derivatives of sulphones of the formula

wherein

R and R′ represent phenyl residues,
X a urea residue, and
Y′ an amino group, the aryl radical being of the benzene and naphthalene series.

6. Azo derivatives of sulphones of the formula

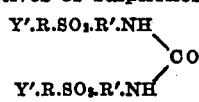

wherein

R and R′ represent phenyl residues, and
Y′ an amino group, the azo group being joined to a radical of the benzene and naphthalene series.

7. Water soluble salts of derivatives of sulphones of the following formula:

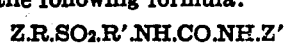

wherein

R and R′ represent phenyl residues,
Z an azo group linked to a radical of the benzene and naphthalene series containing a group capable of forming water-soluble salts, and
Z′ a member of the group consisting of

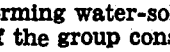

and hydrogen.

8. Process as claimed in claim 1, wherein the aryl coupling component is a naphthol sulphonic acid compound.

9. Process as claimed in claim 1, wherein the aryl coupling component is a hydroxy naphthoic acid.

10. Process as claimed in claim 1, wherein the coupling component is a hydroxy naphthalene disulphonic acid compound.

11. Process as claimed in claim 1, wherein the coupling component contains a hydroxy group and a salt-forming group.

12. A compound of the formula

wherein R and R' represent phenyl radicals, X is a urea residue, and X' is a radical of the benzene and naphthalene series containing at least one neutralized salt-forming group.

13. A compound as defined in claim 12, wherein X' is a naphthyl radical.

14. A compound of the formula

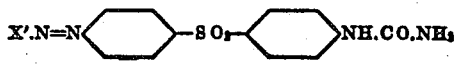

X' being a naphthyl radical containing at least one neutralized salt-forming group.

15. A member of the group consisting of 4 - ureido-diphenylsulphone-4',2''-azo-1''-naphthol-3'',6''-disulphonic acid and its disodium salt.

16. A member of the group consisting of 4 - ureido-diphenylsulphone-4',3''-azo-2''-naphthol-1''-sulphonic acid and its sodium salt.

17. A member of the group consisting of 4 - ureido - diphenylsulphone - 4',4''-azo-3''-hydroxy-2''-naphthoic acid and its sodium salt.

MAX DOHRN.
OTTO LAUBEREAU.